Feb. 15, 1927.

J. H. DELANY 1,617,672

CHUCK

Filed Oct. 15, 1925   2 Sheets-Sheet 1

Inventor
James H. Delany

By Biedwin & Wright

His Attorneys

Feb. 15, 1927.

J. H. DELANY 1,617,672

CHUCK

Filed Oct. 15, 1925  2 Sheets-Sheet 2

Inventor
James H. Delany

By Bredwin Wright
His Attorneys

Patented Feb. 15, 1927.

1,617,672

UNITED STATES PATENT OFFICE.

JAMES H. DELANY, OF SOUTH ORANGE, NEW JERSEY.

CHUCK.

Application filed October 15, 1925. Serial No. 62,559.

This invention relates primarily to the type of chuck usually known as a spud chuck in which the holding jaws are inserted within a hole or recess in the work piece. This hole may or may not be screw threaded.

It is always desirable to be able to move the engaging jaws to holding or to releasing position without stopping the machine. It has been found in many cases that where the work piece is screwed on to the usual spud chuck and set tightly against a shoulder or stop collar that after the turning operation has been completed relatively great force is needed to unscrew the work from the spud since the drag of the cutting tools has been sufficient to set the work very hard against the thrust or limit collar. For this reason chucks of this type have been made with adjustable or removable limit collars intended to facilitate the removal of the work by breaking this jam nut effect between the work and thrust collar. These have been found to have the great disadvantage that since they are not permanently fixed a series of pieces of work may not occupy exactly the same position on the spud which would prevent the production of identical articles.

The chuck herein disclosed can be collapsed or expanded while the machine is running, it has sufficient power when expanded or contracted to hold securely a piece of work, it will automatically destroy the jam nut binding effect above mentioned, and automatically release the finished work while the machine is running. A new piece of work can also be put in place easily while the machine is in operation.

Detailed objects of the invention will be apparent from the following description and the appended claims.

Figure 1:
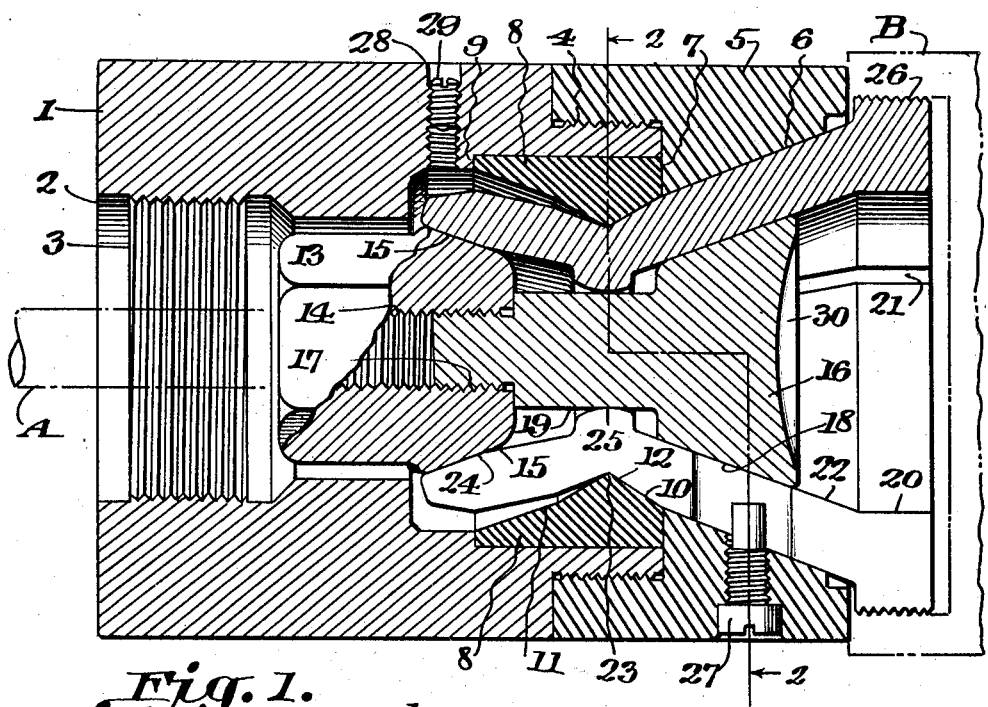
Figure 1 is a longitudinal section through the chuck in holding position.
Figure 2:
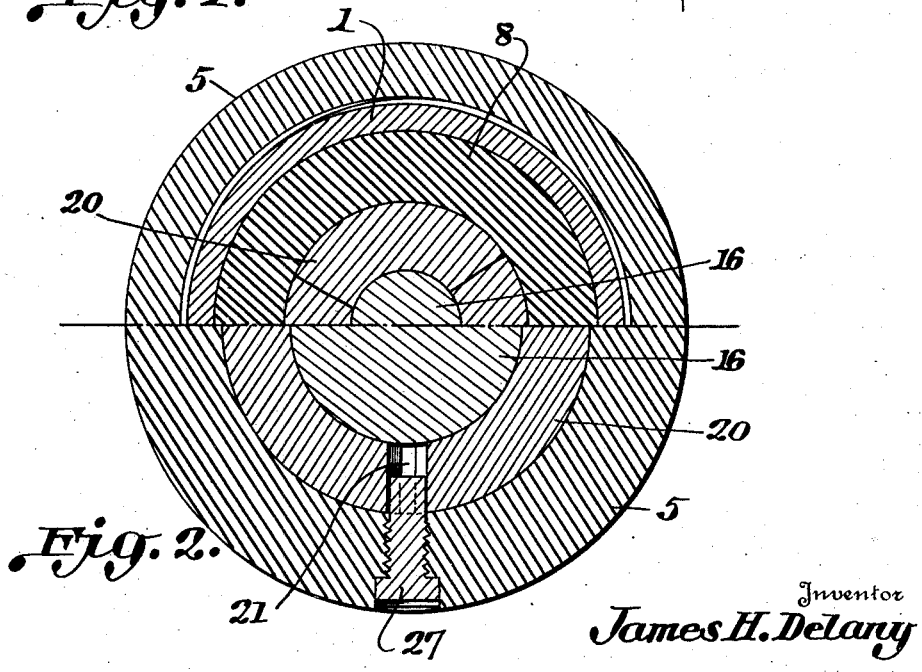
Figure 2 is a cross section on the line 2—2 of Figure 1.

A hollow metal shell 1 is threaded at the rear end 2 to receive the spindle 3 of the machine tool. At its forward end the exterior diameter is reduced and it is threaded at 4 to receive a collar 5 which is threaded thereon. This collar has an internal taper 6 and a shoulder 7 which is adapted to bear against the front end of a bearing ring 8 and hold the same in position against a shoulder 9 in the shell 1.

This bearing ring 8 has an internal front tapered face 10 and rear tapered face 11. At the conjuncture of these faces is a knife edge bearing 12.

A nut 13 is internally threaded at its rear end 14 to receive the operating draw and thrust rod A and is also threaded at its front end to receive an operating member hereinafter described. This nut is also provided at its front on the outside thereof with a tapered portion 15.

A plug member 16 has a rear reduced threaded end 17 which screws into the nut 13. Its enlarged front end has an exterior taper 18 which corresponds to the internal taper of the jaws 20. This plug member has a central substantially cylindrical portion 19.

A plurality of holding jaws 20, here shown as three in number, are segmental in form and when assembled form a substantially three-part cup at their outer ends, the parts being separated by spaces 21. These parts have an internal taper 22 on the front portion to match the taper 18 on the plug 16. The rear portions of the holding jaws are also provided with an external taper which meets the external taper of the front portion of the jaw at 23, thus forming substantially a circumferential groove which rests upon the knife edge bearing 12 of the bearing block 10. The holding jaws 20 have on their rear ends tapered faces 24 which match the faces 15 on the outside of the nut 13. The jaws also have an intermediate rounded portion 25 which rocks upon the central cylindrical portion 19 of the plug 16 when the jaws are operated as hereinafter described.

As illustrated the chuck jaws are intended to be inserted into a circular opening in the end of the work piece B and are shown as screw threaded at 26 although they may be smooth on their periphery. It is also possible to use this chuck to grip a spindle of the work piece in which case the inner portion of the jaw ends would be the engaging portion and might be either smooth or screw threaded. Fitting substantially within the slots 21 are provided screws 27 which screw through appropriate openings in the collar 5 and have ends projecting into said slots. These act as spacing members for the jaws and also if there is any tendency for the jaws to slip they would also act as driving members. A suitable opening 28 may be provided through the shell 1 and normally closed with a plug 29 for the purpose of oiling the chuck parts. The outer or front end of the plug 16 may be provided with a screw driver slot 30 by which the plug may be screwed into position.

In assembling the parts of the chuck all of which are preferably made of steel, a bearing ring 8 is placed within the shell 1 and the collar 5 is screwed on the shell to secure the bearing ring in position. The jaws 20 are then inserted from the front end and the nut 13 is placed within the jaws from the rear. The plug 16 is then inserted from the front and screwed securely into the nut 13. If employed the spacing screws 27 are then screwed into place and the chuck is ready for use. It will be noted that when assembled the operating draw and thrust rod A, the nut 13, and the plug 16 all move lengthwise as a unit along the axis of the machine spindle. The nut 13 may be first placed on end of rod A.

In assembling the parts it is preferable to leave the jaws soft, mount the chuck on the spindle of the machine, and turn the holding faces 26 of the jaws the required size and thread them if desired. The jaw segments are then removed from the shell, hardened to resist wear, and reinserted.

Figure 3:
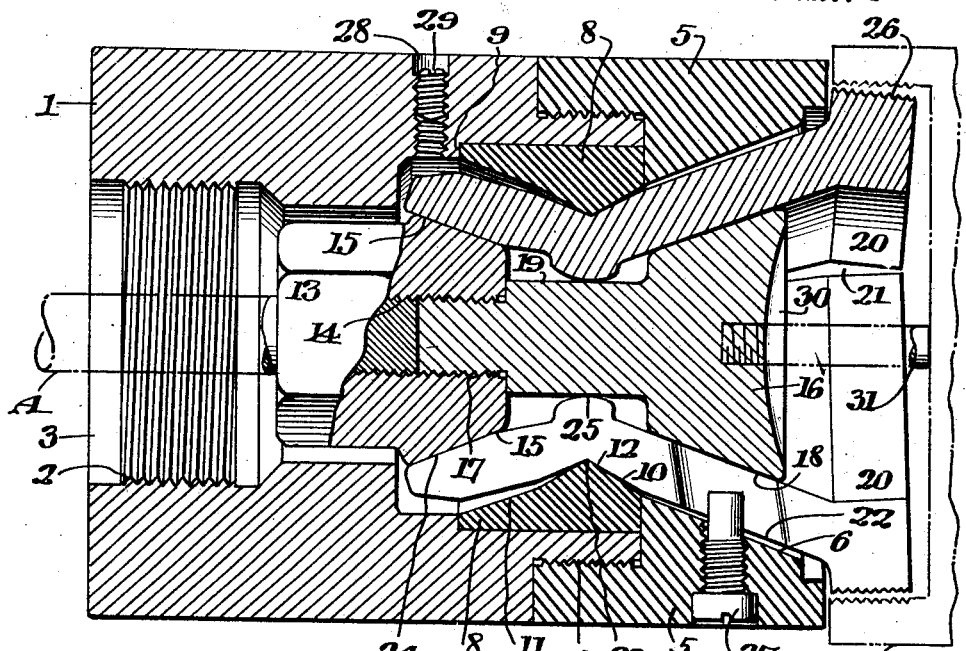
Figure 3 is a longitudinal section similar to Figure 1 but showing the jaws in releasing position and also showing a slight modification.
Figure 4:
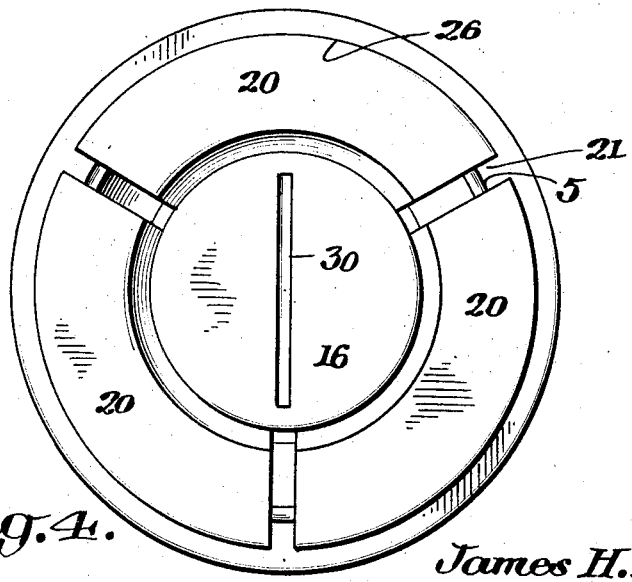
Figure 4 is a front end view of the chuck.

It will be noted that the diameter of the knife edge bearing 12 is considerably less than the diameter of the holding portion of the jaws 20. When the parts are in Figure 1 position and it is desired to release the work the thrust rod A is moved by a lever, compressed air, or other desired means, toward the right in Figure 1. This moves the taper 18 of the plug 16 away from the tapered portion 22 of the holding jaws leaving them free to swing about the knife edge bearing. At the same time the tapered portion 15 of the plug 13 engages the tapered portions 24 of the jaws 20 forcing them outward and thereby positively forcing the holding end of the jaws out of engagement with the work and into the position shown in Figure 3. Due to the fact that the outer holding portions of the jaws lie in a circle of much greater diameter than that of the knife edge bearing about which the jaws move, it is obvious that the inward swinging of the jaws will not only move them away from the portion of the work piece with which they have been in engagement but will also cause them to project farther beyond the end of the collar 15 than when they are in holding position. This will positively move the work piece to the right out of engaging or jamming relation with the limit collar 5.

In order to render this action still more positive the plug 16 may be provided with a pin 31 which extends sufficiently beyond the end of the jaws to engage the work piece when the plug is moved endwise.

The work piece may be placed upon the jaws when they are in a fully expanded position if a fine screw thread is employed or it may be placed thereon when they are in a collapsed position. This is probably preferable if the holding portion of the chuck jaws is smooth or is coarsely screw threaded. It is sometimes found desirable to have a screw threaded portion very slightly tapered toward its outer end.

It will be noted that this chuck comprises a minimum number of parts which are entirely enclosed and which are free from springs and adjustable screws of any kind. It has a perfectly smooth exterior and is relatively small in size. All of its actions are entirely positive and work pieces of various types may be handled by the substitution of different forms of jaws with no other variation in the construction of the chuck or its operation. To substitute such new jaws it is merely necessary to unscrew the plug 16, remove the pins 27 if there be any, and take out the jaws 20.

It is obvious that minor changes may be made in the precise embodiment of the invention without in any way departing from the spirit thereof. It is therefore to be understood that the invention is limited only by the scope of the appended claims.

I claim as my invention:

1. A chuck comprising a shell portion, an independent bearing ring therein, a thrust collar holding said ring in position, a plurality of jaws fulcrumed on said bearing ring, and means for positively rocking said jaws on said bearing ring in both directions.

2. A chuck comprising a shell portion, an independent bearing ring therein provided with an internal knife edge bearing, a plurality of jaws fulcrumed intermediate their ends on said knife edge bearing and movable outwardly to operative position, and means for positively operating said jaws in both directions.

3. A chuck comprising a shell portion, a bearing ring therein, a plurality of jaws fulcrumed on said bearing ring intermediate their ends and having portions tapering outwardly in both directions from the part engaging the bearing, and a slidable operating member having tapered portions engaging those of the jaws to positively rock the jaws in both directions by sliding movement of said member.

4. A chuck comprising a shell portion, a bearing ring therein, a plurality of jaws fulcrumed on said bearing ring intermediate their ends and tapering in both directions outwardly therefrom, a nut having a tapered portion engaging the jaws on one side of the bearing, a plug connected to said nut and having a tapered portion engaging the jaws on the other side of the bearing, and means for moving the nut and plug endwise thereby rocking the jaws.

5. A chuck comprising a shell portion, a bearing ring therein, a thrust collar threaded on said shell portion and holding the bearing ring in position, a plurality of segmental jaws fulcrumed on said bearing ring and tapered outwardly in each direction from the bearing to form two substantially cup-shaped portions, and a slidable member having cam portions to engage the inside of said cup-shaped portions and positively move the jaws in both directions.

6. A chuck comprising a shell portion, an independent bearing ring therein having an internal knife edge bearing, a plurality of jaws fulcrumed on the bearing and having portions tapering outwardly in both directions from the part engaging the bearing, the outer ends of the jaws having holding portions of substantially greater diameter than the diameter of the knife edge bearing and movable outwardly to operative position, and endwise movable means having tapering portions engaging the inner surfaces of the jaws to move them positively in both directions.

In testimony whereof, I have hereunto subscribed my name.

JAMES H. DELANY.